United States Patent [19]

Ruggeberg et al.

[11] Patent Number: 4,957,832
[45] Date of Patent: Sep. 18, 1990

[54] PLASTIC SEALING ELEMENT FOR A GALVANIC PRIMARY CELL

[75] Inventors: Klaus Ruggeberg, Ellwangen; Horst-Udo Jose, Fichtenau-Unterdeufstetten, both of Fed. Rep. of Germany

[73] Assignee: Varta Batterie Aktiengesellschaft, Hanover, Fed. Rep. of Germany

[21] Appl. No.: 271,021

[22] Filed: Nov. 14, 1988

[30] Foreign Application Priority Data

Dec. 11, 1987 [DE] Fed. Rep. of Germany ....... 3742026

[51] Int. Cl.$^5$ .................. H01M 2/04; H01M 2/08
[52] U.S. Cl. .................... 429/164; 429/169; 429/173
[58] Field of Search .......... 429/164, 165, 166, 167, 429/168, 169, 171, 172, 173, 174, 185, 181

[56] References Cited

U.S. PATENT DOCUMENTS

| | | | |
|---|---|---|---|
| 3,276,912 | 10/1966 | Pun | 429/172 |
| 3,623,915 | 11/1971 | Pun et al. | 429/168 |
| 3,973,995 | 8/1976 | Kamai | 429/173 |
| 4,407,914 | 10/1983 | Inoue et al. | 429/174 |

FOREIGN PATENT DOCUMENTS

| | | | |
|---|---|---|---|
| 0147359 | 11/1981 | Japan | 429/174 |
| 0012259 | 1/1983 | Japan | 429/174 |

*Primary Examiner*—Donald L. Walton
*Attorney, Agent, or Firm*—Weiser & Stapler

[57] ABSTRACT

A plastic sealing element for dry cells includes a radially symmetrical, centrally perforated base element, the upper side of which is provided with an elastomeric sealing material which is extruded in the form of a circumferential annular bead, and a process for its manufacture. After the sealing element is pre-assembled with the cell's metal housing cover and the cell is assembled, the annular bead is pressed flat during final crimping so that a sealing zone having a small cross section and defining a long leakage path is developed between the cover and the base element, effectively preventing the leakage of electrolyte or water vapor, which is especially diffuse from the cell's porous carbon rod conductor, into the cell's sealing zone.

26 Claims, 2 Drawing Sheets

PLASTIC SEALING ELEMENT FOR A GALVANIC PRIMARY CELL

BACKGROUND OF THE INVENTION

The present invention generally pertains to a plastic sealing element for galvanic primary cells, particularly those in the form of round cells having a metal casing and a centrally disposed carbon rod conductor, as well as a process for producing and using this plastic sealing element.

Many types of seals have been used in connection with galvanic primary cells of the Leclanche type. Most of these seals take the general form of a disk-shaped or plate-shaped plastic element, which serves as the primary component for the particular sealing arrangement which is used. Sealing elements of this general type will conventionally include a central opening for receiving the carbon rod conductor so that the zinc can is effectively sealed. An example of this basic approach may be found in DE-PS 26 19 178.

DE-AS 19 37 605 discloses a sealing element which has the conventional shape of a hollow sealing cap, but which at one (inner) side surrounds the carbon rod with a central opening (forming a sleeve), and which at the other (outer) side contacts the inner wall of the zinc can with a downwardly extending outer edge. However, above these contact zones, a peripheral space is developed which separates the sealing cap from both the carbon rod and the zinc can. As a result, before the edge of the zinc can is crimped to engage the sealing cap, this space must be filled with a sealing compound. This develops large sealing surfaces which make it more difficult for electrolyte to leak from the interior of the cell, but only at the cost of requiring additional manufacturing steps.

A cell sealing system which is considerably simpler in design is disclosed by West German Utility Model No. 19 21 573, which describes an annular rubber disk which sits on top of the plastic cover for the electrode can, and a rubber ring of the same outer diameter as the annular disk. During assembly, the lower flange-like edge of the metal positive terminal is set on the annular disk, and the rubber ring is laid on the flange-like edge. The pressure generated by crimping the metallic housing jacket leads to a slight deformation of these flexible sealing members, such that the annular disk is forced into the space between the housing jacket and the outer circumference of the flanged edge of the positive terminal. This improves electrolyte sealing with respect to the housing, but not with respect to the carbon rod, since the narrow sealing zone between the carbon rod and the annular disk represents only a limited obstacle to electrolyte leakage, particularly in view of the porous carbon material. This leaves the possibility that some electrolyte will penetrate into and be retained within the space defined between the raised center contact of the cap and the annular disk.

SUMMARY OF THE INVENTION

It is therefore the primary object of the present invention to provide an improved plastic sealing element for a galvanic primary cell.

It is also an object of the present invention to provide a plastic sealing element for a galvanic primary cell which is simple in construction, yet reliable in operation.

It is also an object of the present invention to provide a plastic sealing element for a galvanic primary cell which can be quickly assembled while effectively preventing a leakage of electrolyte or water vapor, not only along the contacting region developed between the plastic sealing element and the cell's housing wall, but also along the contacting region developed between the plastic sealing element and the cell's carbon rod conductor.

It is also an object of the present invention to provide improved processes for producing the plastic sealing element, and for assembling a galvanic primary cell using the plastic sealing element.

These and other objects are achieved in accordance with the present invention by providing a plastic sealing element for a galvanic primary cell which comprises a radially symmetrical sealing body having a raised central opening for receiving the cell's carbon rod conductor, and an upper surface which includes a circumferential trough-shaped depression bordered by a raised rim and defining a flat base for receiving an elastomeric plastic material which is extruded as a continuous annular bead.

A process is provided for producing this plastic sealing element which includes the initial manufacture of the sealing body, and the subsequent application of the elastomeric plastic material to the sealing body by extrusion onto the flat base of the trough-shaped depression from a fine nozzle while the sealing body is rotated beneath the nozzle, preferably developing a series of coils which subsequently combine to form a uniform annular bead. The resulting plastic sealing element is then used to seal a galvanic primary cell in the course of its manufacture.

For further detail regarding this plastic sealing element and processes for its manufacture and use in connection with the assembly of a galvanic primary cell, reference is made to the description which is provided below, in conjunction with the following illustrations.

BRIEF DESCRIPTION OF THE DRAWINGS

In these views, like reference numerals denote similar structures.

DETALIED DESCRIPTION OF THE PREFERRED EMBODIMENT

Figure 1:
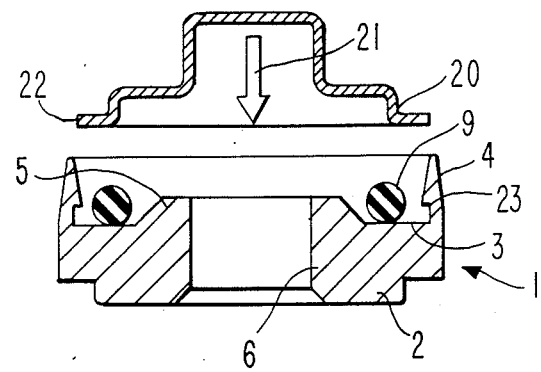
FIG. 1 is an exploded, cross-sectional view of a plastic sealing element according to the present invention, prior to assembly with a metallic positive cap.

Referring to FIG. 1, the sealing element 1 of the present invention generally takes the form of a radially symmetrical body 2 which essentially resembles a perforated disk and which is formed of an acid-resistant plastic. Upper portions of the body 2 are provided with a circumferential, trough-like, flat-bottomed depression 3 which extends between a raised rim 4 and a conically projecting (frustoconical) swell 5.

Figure 2:
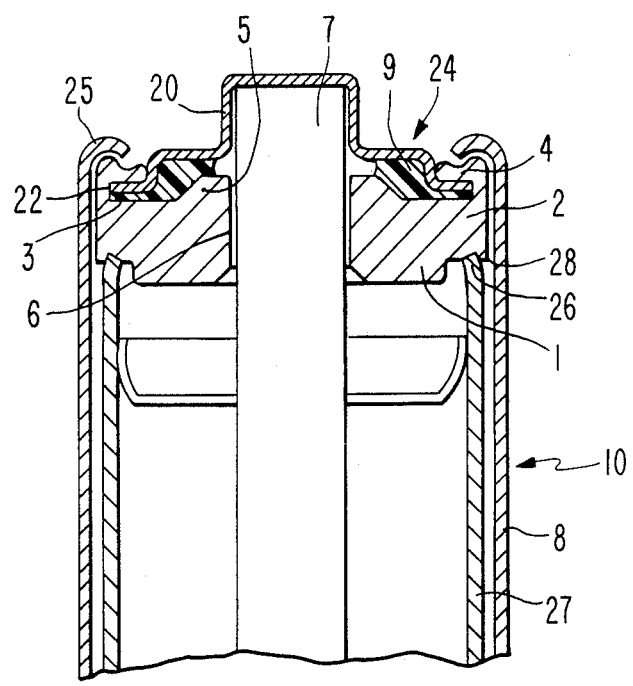
FIG. 2 is a partial, cross-sectional view of an assembled dry cell produced with the plastic sealing element of the present invention.

Referring now to FIG. 2, the swell 5 includes a central opening 6 for receiving the cell's carbon rod conductor 7. The outer diameter of the raised rim 4 should preferably at least approximate the inside diameter of the cell's metal jacket 8, so that a snug fit results.

To complete the structure forming the sealing element 1, an annular bead 9 formed of a flexible plastic material is extruded onto the flat-bottomed depression 3. The disk-shaped body 2 of the sealing element 1 is generally formed of a plastic material that is relatively hard, although appropriate for sealing purposes. However, in accordance with the present invention, a particularly soft plastic from the elastomer group is used to form the annular extrusion which develops the bead 9.

Those plastics which are selected for use in accordance with the present invention should be dimensionally stable up to about 50 degrees Celcius, and should of course be corrosion-resistant up to much higher temperatures. They should also be characterized by extreme deformability at both low and high temperatures, and should exhibit good adhesion both to other plastics and to metals. Such plastics should also be hydrophobic. Elastomeric adhesives such as the adhesive acrylic resins, as an example, are therefore useful in this regard since they are not only capable of conforming to narrow sealing gaps, but can also fill macroscopic depressions in the surfaces being sealed (including fine cracks, gaps, pores and the like).

One elastomeric plastic material which is particularly suited to the requirements of the present invention is found in a copolymer of ethylene and vinyl acetate (EVA). Also suitable are the ethylene-acrylates (EAM), which are also derived from the elastomer group, especially ethylene-butylacrylate, as well as ethylene-tetrafluoroethylene copolymer (ETFE).

Figure 3:
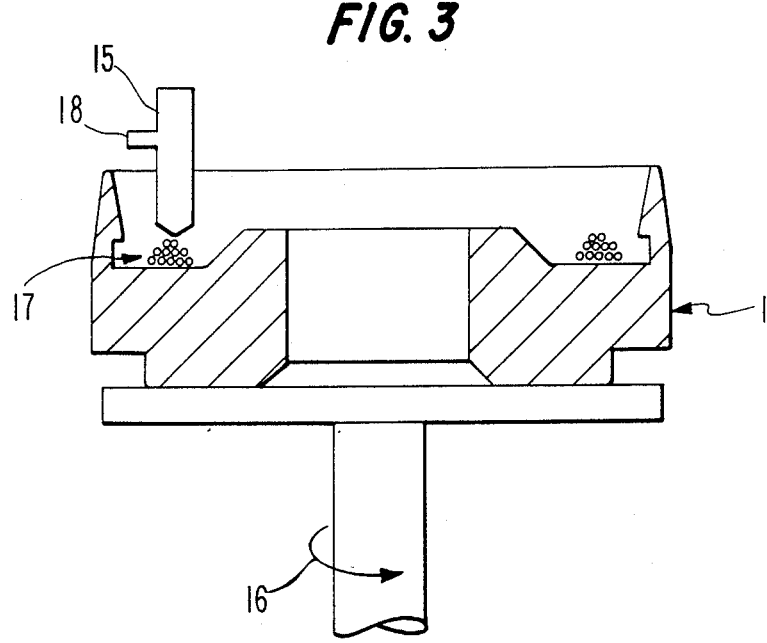
FIG. 3 is a schematic, perspective view of a process for manufacturing the plastic sealing element.

Referring now to FIG. 3, the selected elastomer is applied onto the relatively hard base element of the body 2 by extrusion from a fine nozzle 15 while the base element rotates beneath the nozzle 15 at high speed (schematically shown at 16). This causes a thin skein of the emerging plastic to be laid down upon the trough-like circumferential depression 3 of the body 2 as a series of coils 17 which, following a short, timed pressurization interval (obtained by opening a needle valve 18 in the nozzle 17) leaves a uniform annular bead 9 which adheres to the hard plastic substrate of the flat-bottomed depression 3 (because the individual coils flow into one another).

In assembling a dry cell 10 using the sealing element 1 of the present invention, the sealing element 1 and a metal positive cap 20 are first pre-assembled by inserting the positive cap 20 into the plastic element 1 (in the direction of the arrow 21 shown in FIG. 1). In this process, the positiVe cap 20 is pressed in until its flange-like edge 22 snaps into place beneath a protrusion 23, which is preferably formed as part of the raised rim 4 of the sealing element 1. This initial step produces considerable deformation of the elastomeric deposit forming the annular bead 9.

The pre-assembled component comprising the sealing element 1 and the positive cap 20 (the metal housing cover) is then inserted into the opening 24 of the metal jacket 8 of the dry cell 10 (previously filled with an active material and electrolyte). Centering of the sealing element 1 is assisted by the carbon rod 7 and the raised rim 4 of the sealing element 1. The edge 25 of the metal jacket 8 (casing) for the resulting cell is then crimped over the edge 22 of the positive cap 20. Due to the pressure resulting from this crimping procedure, the edge 26 of the cell's zinc can 27 cuts slightly into the lower side 28 of the sealing element 1, while the elastomeric material forming the annular bead 9 is completely compressed between the surface of the flat-bottomed depression 3 and the positive cap 20, in addition to being forced toward the carbon rod 7 (as is best illustrated in FIG. 2).

An especially advantageous seal results, due primarily to the annularly extruded bead 9 of elastomeric plastic material. Because of its extreme deformability, the elastomeric plastic material is reduced to a very small sealing cross section, by being flattened, while the surfaces which contact the base element and the positive cap are made proportionately large. The sealing compound thus represents a reliable water vapor barrier, and in the same way prevents electrolyte leakage because of the extremely long electrolyte leakage path which is developed along the previously described contacting surfaces. If the sealing zone originating from the elastomeric bead 9 of the sealing element 1 of the present invention were not present, moisture leakage from the crimped edge would be unavoidable due to the water vapor permeability of the carbon rod 7. The sealing element 1 of the present invention therefore operates to satisfy the various objects which were previously set forth since, with its use, a dry cell can be produced in which the water vapor that would otherwise diffuse or permeate from the porous carbon rod 7 is effectively intercepted in the resulting sealing zone which is developed.

To confirm the improved performance of the sealing element 1 of the present invention, voltage measurements were performed on cells which were subjected to storage, in humidity, for three months. As a control, the elastomeric component 9 of some of these seals was omitted. Following storage, the cells sealed according to the present invention yielded the same reference values for open-circuit voltage and for voltage under load as in fresh cells, with no significant variation. However, the voltage values measured on the comparison (control) cells were widely varying and generally lower. This is believed to be attributable to the lack of sealing between the carbon rod and the outer metal casing, which leads to leakage of electrolyte and/or water vapor.

It will be understood that various changes in the details, materials and arrangement of parts which have been herein described and illustrated in order to explain the nature of this invention may be made by those skilled in the art within the principal and scope of the invention as expressed in the following claims.

What is claimed is:

1. A plastic sealing element for a galvanic primary element in the form of a round cell including a metal casing, a metal housing cover and a carbon rod conductor, comprising a radially symmetrical plastic body, the upper surface of which defines a circumferential trough-shaped depression bounded by a raised rim, said raised rim including a circumferential projection for receiving edge portions of the metal housing cover and an elastomeric plastic material formed as a continuous annular bead on the trough-shaped depression.

2. The plastic sealing element of claim 1 wherein the elastomeric bead is positioned on the trough-shaped depression spaced away from and not in contact with the rim of the plastic body.

3. The plastic sealing element of claim 2 wherein said trough-shaped depression includes a centrally disposed, frustoconical projection extending therefrom.

4. The plastic sealing element of claim 3 wherein said projection includes a centrally disposed opening for receiving the carbon rod conductor of said galvanic primary element.

5. The plastic sealing element of claim 2 wherein said annular bead is compressed between and against surface portions of said plastic body and said metal housing cover when the edge portions of said metal housing cover are received by the circumferential projection of said raised rim.

6. The plastic sealing element of claim 2 wherein the elastomeric plastic material is softer than the material forming said plastic body.

7. The plastic sealing element of claim 2 wherein the elastomeric plastic material is selected from the group consisting of the adhesive acrylic resins.

8. The plastic sealing element of claim 2 wherein the elastomeric plastic material is an ethylene-vinyl acetate copolymer.

9. The plastic sealing element of claim 2 wherein the elastomeric plastic material is selected from the group consisting of the ethylene acrylates.

10. The plastic sealing element of claim 2 wherein the elastomeric plastic material is ethylene-butylacrylate.

11. The plastic sealing element of claim 2 wherein the elastomeric plastic material is an ethylene-tetrafluoroethylene copolymer.

12. A galvanic primary element in the form of a round cell having means for minimizing moisture or electrolyte leakage including an outer metal casing, a carbon rod conductor and a metal housing cover having a surface which includes a raised center for receiving the carbon rod conductor and edge portions for engagement by the outer metal casing, said primary element further comprising a plastic sealing element in the form of a radially symmetrical plastic body, the upper surface of which defines a circumferential trough-shaped depression bounded by a raised rim which includes a circumferential projection for receiving edge portions of the housing cover and a deformable adhesive elastomeric plastic material flattened between and against the surface of the housing cover and the surface of the plastic body thereby forming a sealing zone along a leakage path between the carbon rod conductor and outer metal casing.

13. The galvanic primary element of claim 12 wherein said trough-shaped depression includes a centrally disposed, frustoconical projection extending therefrom.

14. The galvanic primary element of claim 13 wherein said projection includes a centrally disposed opening for receiving the carbon rod conductor of said galvanic primary element.

15. The galvanic element of claim 12 wherein the flattened elastomer is entirely enclosed within the surfaces of the plastic body and the housing cover.

16. The galvanic primary element of claim 12 wherein the elastomer contacts proportionally large surface portions of the housing cover and plastic body with respect to the thickness of the elastomer cross-section.

17. The galvanic primary element of claim 12 wherein the elastomeric plastic material is softer than the material forming said plastic body.

18. The galvanic primary element of claim 12 wherein the elastomeric plastic material is an acrylic resin.

19. The galvanic primary element of claim 12 wherein the elastomeric plastic material is an ethylene-vinyl acetate copolymer.

20. The galvanic primary element of claim 12 wherein the elastomeric plastic material is an ethylene acrylate.

21. The galvanic primary element of claim 12 wherein the elastomeric plastic material is ethylene-butylacrylate.

22. The galvanic primary element of claim 12 wherein the elastomeric plastic material is an ethylene-tetrafluoroethylene copolymer.

23. The galvanic primary element of claim 12 wherein the sealing zone is a barrier to water vapor diffusing from the carbon rod.

24. The galvanic primary element of claim 12 which provides means for deforming and forcing the elastomeric plastic material into a cavity between the housing cover and plastic body.

25. The galvanic primary element of claim 24 wherein engagement of the housing cover with the circumferential projection of the raised rim deforms and forces the elastomer into the cavity.

26. The galvanic primary element of claim 25 wherein a crimp of the outer metal casing over the housing cover and plastic body deforms and forces the elastomer into the cavity.

* * * * *